(12) United States Patent
Peng et al.

(10) Patent No.: US 7,174,231 B2
(45) Date of Patent: Feb. 6, 2007

(54) AUTOMATIC PROCESS MONITORING SYSTEM FOR ASSOCIATING AN EQUIPMENT IDENTIFICATION AND A DATA COLLECTION OPERATION AND METHOD OF USE THEREOF

(75) Inventors: Ping-Ling Peng, Hsin-Chu (TW); Carrie Kang, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 844 days.

(21) Appl. No.: 10/402,198

(22) Filed: Mar. 28, 2003

(65) Prior Publication Data

US 2004/0189719 A1   Sep. 30, 2004

(51) Int. Cl.
*G06F 19/00* (2006.01)
(52) U.S. Cl. .......................................... 700/96
(58) Field of Classification Search ................ 700/95, 700/96, 109, 180
See application file for complete search history.

(56) References Cited

U.S. PATENT DOCUMENTS 4,974,166 A * 11/1990 Maney et al. ............... 700/113
5,862,054 A * 1/1999 Li .............................. 700/121
2006/0116784 A1* 6/2006 Chiu et al. .................. 700/110

* cited by examiner

*Primary Examiner*—Leo Picard
*Assistant Examiner*—Chad Rapp
(74) *Attorney, Agent, or Firm*—Tung & Associates

(57) ABSTRACT

The present invention provides a process manufacturing integration system (PROMIS) comprising:
 a plurality of PROMIS ISAM files;
 a TEST database having a plurality of TEST fields for storing a plurality of status controlled DCOP definitions within an associated ISAM file;
 a CAUX database having a plurality of CAUX fields for storing a plurality of control chart definitions within an associated ISAM file; and
 an associated graphical user interface to better control each of a plurality of data collection operations (DCOP).

Further provided is a method of using the PROMIS comprising the steps of:
 associating an equipment identification (EQP ID) with a control chart identification (CHART ID) within a chart table (Tc); associating the CHART ID with a data collection operation (DCOP) within a operation chart table (To); and creating a DCOP control methodology chart by combining the Tc with the To to associate the EQP ID with a DCOP.

19 Claims, 7 Drawing Sheets

AUTOMATIC PROCESS MONITORING SYSTEM FOR ASSOCIATING AN EQUIPMENT IDENTIFICATION AND A DATA COLLECTION OPERATION AND METHOD OF USE THEREOF

FIELD OF THE INVENTION

The present invention relates to a process manufacturing integration system that operates to automatically search and pinpoint a relation between an equipment identification (ID) and a data collection operation (DCOP), thereby enhancing overall operation performance and thus preventing mis-operation of DCOPs performed on pieces of fabrication equipment disposed within a fabrication facility.

BACKGROUND

Precise statistical process control within an advanced technology, high-volume, precise manufacturing environment is crucial. In fabrication facilities, typically semiconductor or wafer fabrication facilities, current fabrication equipment monitoring processes require technical employees (TE's) or manufacturing (MFG) operators to apply constraints between equipment identifications (EQP IDs) and a data collection operation (DCOP), wherein the EDP IDs and the DCOPs are available in a statistical control system such as a process manufacturing integration system (PROMIS) available from the PROMIS System Corporation. As disclosed in U.S. Pat. No. 5,778,386 LIN, PROMIS "is a technically advanced, factory automation and management system including a shop floor control system" that "monitors, and controls activity in complex process manufacturing environments."

However, existing monitoring processes using the PROMIS require TE's to memorize relationships between each piece of equipment and a permissible DCOP associated with the piece of fabrication equipment.

In a day-to-day equipment monitoring activity within a fabrication facility, MFG operators must be aware of a corresponding status between a DCOP and a specific piece of fabrication equipment. The MFG operators track the DCOP status either by memorizing the status or by writing the status on a piece of paper because no automatic status tracking exists.

MFG operators manually input an equipment id and an available (memorized) DCOP id into a PROMIS GUI. However, the PROMIS GUI of existing an existing PROMIS does not provide an automated direct relationship between a piece of fabrication equipment and a DCOP defined in PROMIS, thus, the MFG operator is required to memorize an existing status between a DCOP and an equipment ID.

As a result, often DCOPs were mistakenly associated to a piece of equipment having an impermissible DCOP restraint. A mis-operation of the TE can easily occur because using a TE's memory to relate equipment ID's and DCOPs often causes incorrect DCOPs to be applied. Additionally, a TE may not have been aware of a new version of a DCOP, supplied via PROMIS, resulting in additional operator error. Thus if an equipment engineer that defines a new version of a DCOP does not communicate to a MFG operator that a new version of a DCOP has been released, a serious mis-operation will occur.

Using an existing monitoring system, a piece of fabrication equipment's status may be changed to down by an enterprise management system when a DCOP ID is incorrect. It then takes approximately 30 minutes for a TE to clear an incorrect DCOP and to bring the piece of fabrication equipment back online.

A typical wafer fabrication facility may perform 360 monitoring operations per day, wherein some pieces of fabrication equipment within the FAB is monitored twice a day, thus an error due to mis-operation of an incorrectly keyed-in DCOP ID can lead to significant and costly downtime within the FAB.

Currently existing monitoring system take about 20 minutes of production time to unfreeze each DCOP, wherein a process engineer manually updates and checks that the unfreezing operation will not impact lot processing. Such a process results in a total of loss of about 1.7 hours of manpower per day.

It is desirable to provide an automatic system and method for associating an equipment identification with a data collection operation to eliminate the need for manufacturing operators to manually memorize names of each data collection operations performed to monitor a piece of fabrication equipment.

It is further desirable to provide an automatic monitoring system that automatically generates an available DCOP to prevent mis-operations caused by MFG operators.

It is further desirable to provide an automated DCOP methodology chart to reduce operation time of updating DCOPs and chart identifications within a fabrication facility having a user-defined monitoring system.

It is further desirable to automatically search and pinpoint a relation between an equipment ID and a DCOP, thereby enhancing overall operation performance and thus preventing mis-operation of DCOPs performed on pieces of fabrication equipment disposed within a fabrication facility.

It is further desirable to provide a monitoring system that automatically filters out unfrozen or older DCOPs, thereby eliminating the need to manually update unfrozen DCOPs.

It is further desirable to provide a process manufacturing integration system configured to create a DCOP control methodology chart to allow equipment engineers to maintain a DCOP control methodology chart, the DCOP control methodology chart providing a related mapping table of a chart identification, an equipment identification, a DCOP identification, and a product area location and to provide the related mapping table to a MFG operator.

SUMMARY OF THE INVENTION

The present invention operates to automatically search and pinpoint a relation between an equipment identification (ID) and a data collection operation (DCOP), thereby enhancing overall operation performance and thus preventing mis-operation of DCOPs performed on pieces of fabrication equipment disposed within a fabrication facility.

The present invention provides a process manufacturing integration system ("PROMIS") to control machine monitoring operations within a fabrication facility, wherein the fabrication facility is preferably a wafer fabrication facility.

The present invention uses the PROMIS to automatically define a relation between a piece of fabrication equipment and a data collection operation to prevent mis-operation within a wafer fabrication facility, wherein the PROMIS provides an intelligent client environment having an associated graphical user interface ("GUI") to better control each of a plurality of data collection operations ("DCOP").

The PROMIS of the present invention is configured to create a DCOP control methodology chart to control machine monitoring operations within a fabrication facility by operating to define a relationship between a piece of fabrication equipment and a data collection operation to prevent mis-operation within a fabrication facility.

The PROMIS of the present invention having the automated DCOP methodology chart eliminates the need for manufacturing operators to manually memorize names of each data collection operation performed to monitor a piece of fabrication equipment, and thus reduces operation time used to update DCOP definitions and chart identifications within a fabrication facility.

Additionally, the monitoring system of the present invention automatically filters out unfrozen or older DCOPs, thereby eliminating the need to manually update unfrozen DCOPs.

The PROMIS allows fabrication equipment engineers to maintain the DCOP control methodology chart, wherein the DCOP control methodology chart provides a related mapping table of a chart identification, an equipment identification, a DCOP identification, and a product area location and to provide the related mapping table to a MFG operator.

More particularly, in accordance with a preferred embodiment, the present invention provides a process manufacturing integration system (PROMIS) configured to create a DCOP control methodology chart having:
 a plurality of PROMIS ISAM files;
 a TEST database having a plurality of TEST fields for storing a plurality of status controlled DCOP definitions within an associated ISAM file;
 a CAUX database having a plurality of CAUX fields for storing a plurality of control chart definitions within an associated ISAM file; and
 an associated graphical user interface to better control each of a plurality of data collection operations (DCOP).

Further provided is a method of configuring a PROMIS to create a DCOP control methodology chart comprising the steps of:
 associating an equipment identification (EQP ID) with a control chart identification (CHART ID) within a chart table (Tc); associating the CHART ID with a data collection operation (DCOP) within a operation chart table (To); and creating a DCOP control methodology chart by combining the Tc with the To to associate the EQP ID with a DCOP.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention provides a process manufacturing integration system ("PROMIS") to control machine monitoring operations within a fabrication facility, wherein the fabrication facility is preferably a wafer fabrication facility. PROMIS is a technically advanced, factory automation and management system including a shop floor control system available from PROMIS System Corporation. The PROMIS system plans, monitors, and controls activity in complex process manufacturing environments.

The present invention uses the PROMIS to automatically define a relation between a piece of fabrication equipment and a data collection operation to prevent mis-operation within a wafer fabrication facility, wherein the PROMIS provides an intelligent client environment having an associated graphical user interface ("GUI") to better control each of a plurality of data collection operations ("DCOP").

The PROMIS of the present invention is configured to create a DCOP control methodology chart to control machine monitoring operations within a fabrication facility by operating to define a relationship between a piece of fabrication equipment and a data collection operation to prevent mis-operation within a fabrication facility.

The present invention operates to automatically search and pinpoint a relation between an equipment ID and a DCOP, thereby enhancing overall operation performance and thus preventing mis-operation of DCOPs performed on pieces of fabrication equipment disposed within a fabrication facility.

Additionally, the monitoring system of the present invention automatically filters out unfrozen or older DCOPs, thereby eliminating the need to manually update unfrozen DCOPs. The present invention reduces computer integrated manufacturing (CIM) manpower by approximately 0.15 hours per updating operation per day because a specified DCOP version is provided in the DCOP control methodology chart. Thus, when a process engineer updates a DCOP to a latest non-frozen version, the CIM manpower time is significantly reduced.

Additionally the present invention improves a piece of fabrication equipment's throughput by providing approximately an added 0.04% utilization of each inline piece of processing equipment per day.

Figure 1:
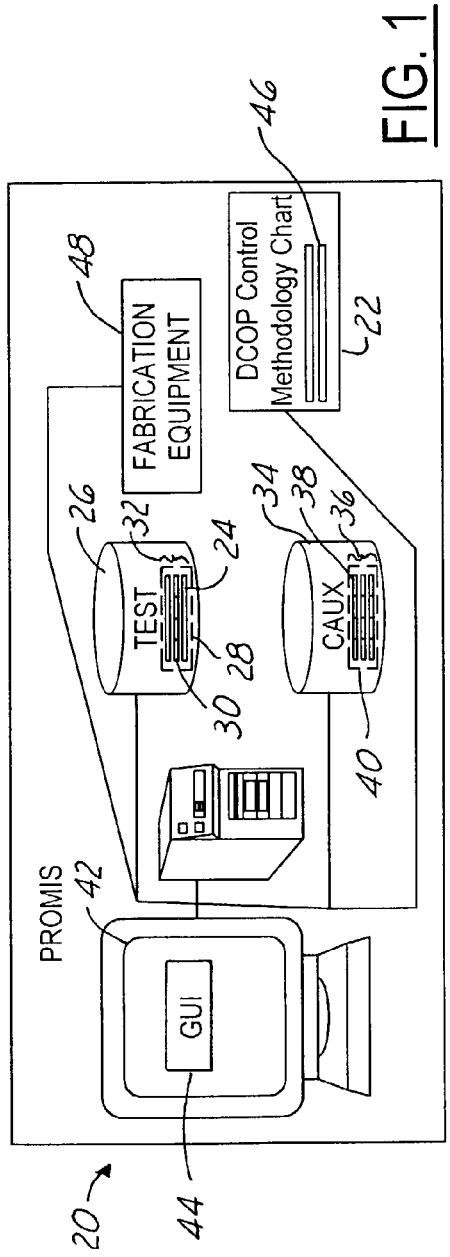
FIG. 1 is a block diagram overview of a PROMIS configured to create a DCOP control methodology chart.

Referring now to the drawings, FIG. 1 shows a PROMIS 20 configured to create a DCOP control methodology chart 22 has:
 a plurality of PROMIS data files (ISAM files) 24;
 a TEST database 26 having a plurality of TEST fields 28 for storing a plurality of status controlled DCOP definitions 30 within an associated ISAM file 32;
 a CAUX database 34 having a plurality of CAUX fields 36 for storing a plurality of control chart definitions 38 within an associated ISAM file40; and
 an intelligent client environment 42 having an associated graphical user interface (GUI) 44 to better control each of a plurality of data collection operations (DCOP) 46 used to monitor a piece of fabrication equipment 48.

Figure 2:
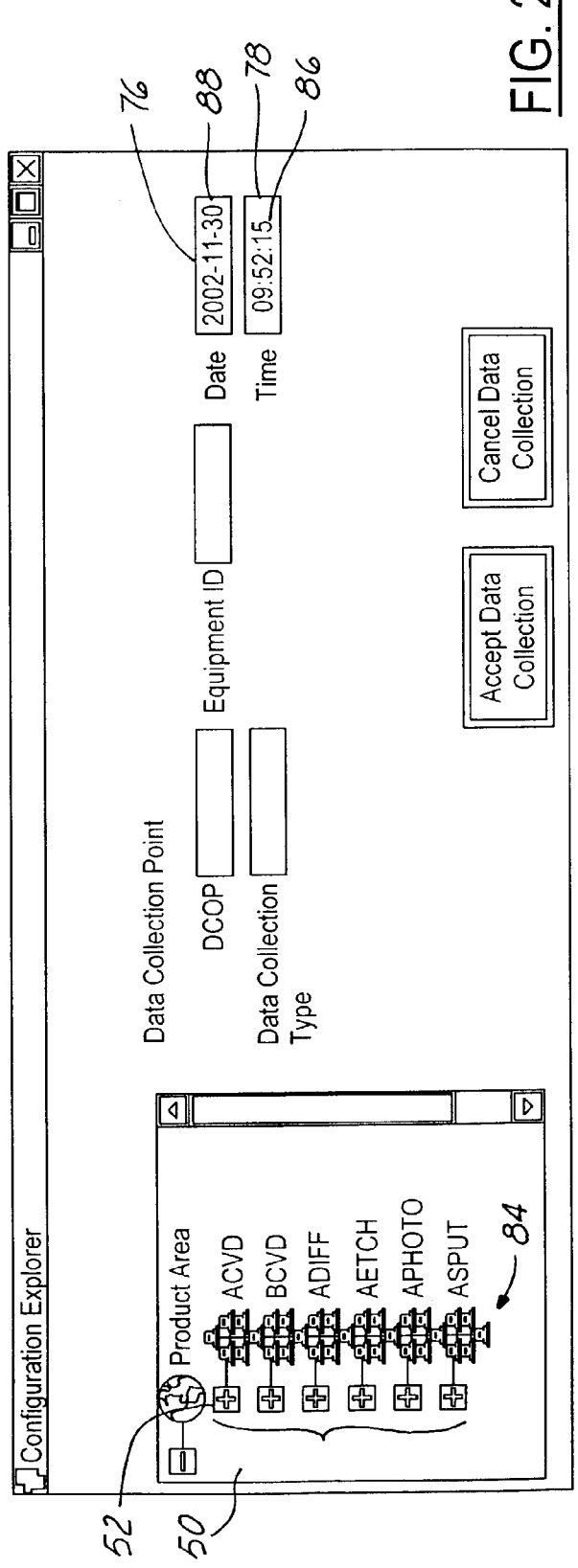
FIG. 2 is a graphical illustration of a GUI having a product area location display.
Figure 3:
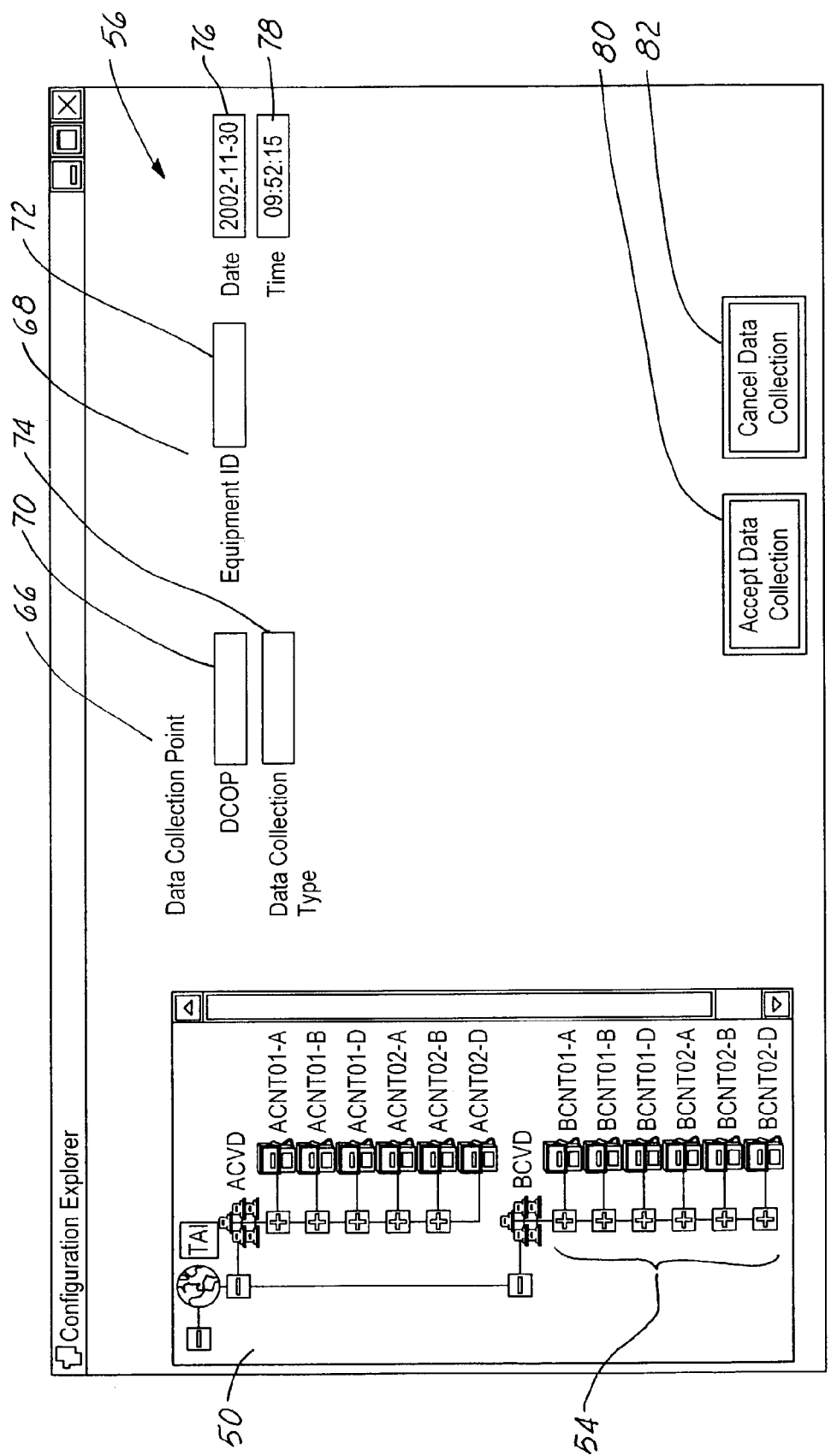
FIG. 3 is a graphical illustration of GUI having an equipment id display.
Figure 4:
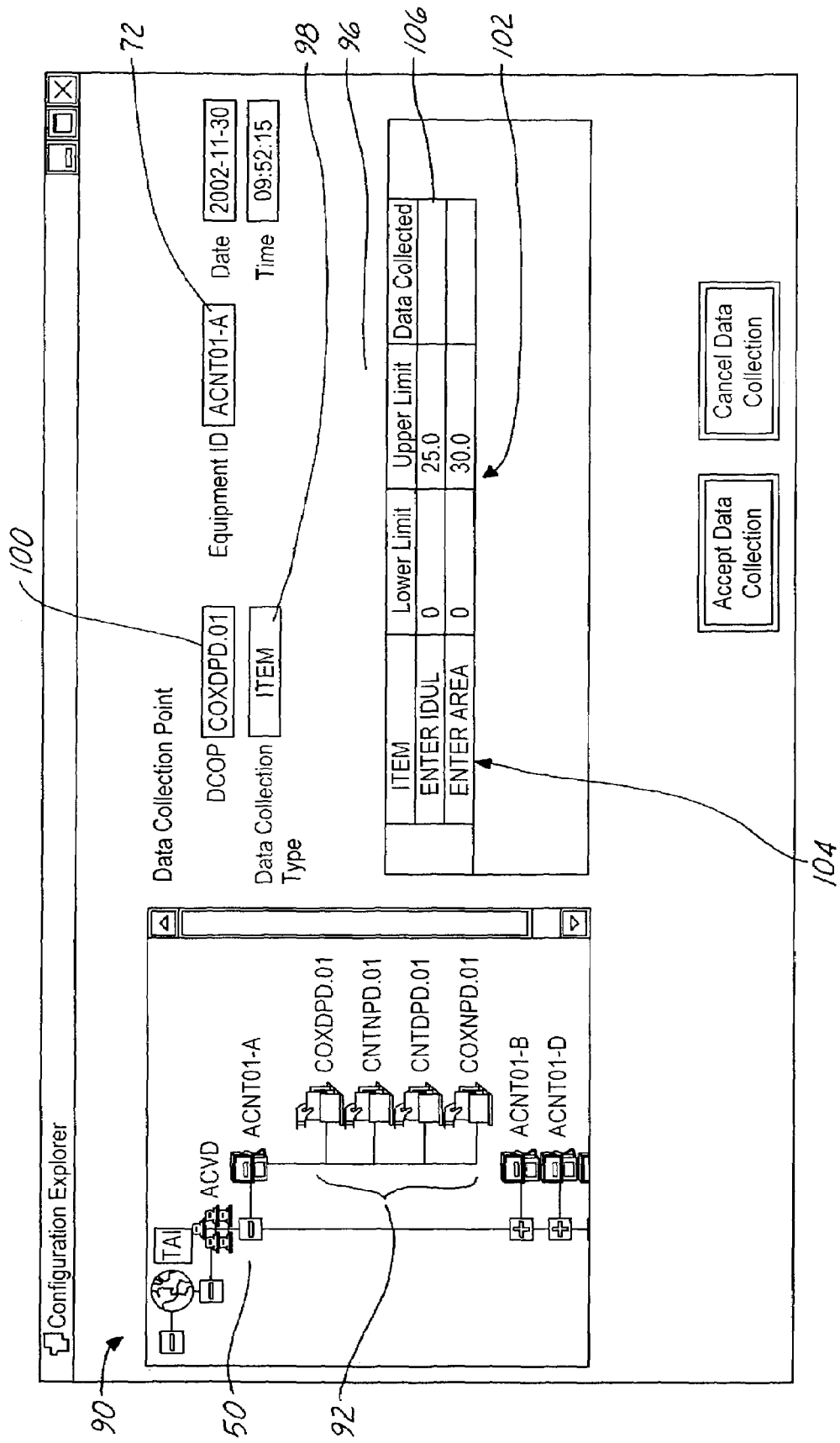
FIG. 4 is a flowchart illustration of DCOP display.

As shown in a preferred embodiment in FIG. 2–4 the GUI has:
 a navigation window 50 having a tree architecture, wherein the tree architecture has a hierarchy of two expandable display levels selected from at least a first display level having a product area location display 52, and a second display level having an equipment identification selection area display 54, wherein each of the expandable display levels has an associated data entry portion 56, and an associated plurality of selectable icons 58, 60 each of the plurality of selectable icons 58, 60 each having an associated tree expander 62, 64.

The data entry portion 56 associated with each of the plurality of display levels disposed within the GUI 44 has:

a data collection point portion 66 having a plurality of predefined fields 68 into which data collection data may be input, the plurality of predefined fields 68 selected from the group of a DCOP field 70, an equipment ID field 72, a data collection type field 74, a date field 76, and a time field 78, the data collection point portion 66 further having an accept data collection button 80, and a cancel data collection button 82.

In accordance with the preferred embodiment shown in FIGS. 2–4 shows the product area location display 52 having a plurality of product areas associated with each product area within a wafer fabrication facility. The first level display shows a plurality of selectable product area location icons 84, for selecting a plurality of process areas within a wafer fabrication facility. The plurality of selectable product area location icons, ACVD, BCVD, ADIFF, AETCH, APHOTO, and ASPUT are associated with a chemical vapor deposition (CVD) process, a diffusion process, an etching process, a photolithography process, and a sputtering process, respectively. However, the product area location icons may be associated with any process performed within a wafer fabrication facility. A fabrication equipment engineer or a technical employee responsible for defining product areas within the GUI 44 may define additional product area icons within the product area location display 52.

Additionally, associated time data 86 and associated date data 88 are automatically input into the time field 78 and the date field 76 disposed within the data collection point portion 66 respectively by the PROMIS 20 when the product area location display is displayed.

As shown in FIG. 2 the associated time data 88 (09:52:15) was input into the time field 78 and the associated date data 88 (2002-11-30) was input into the date field 76 when the product area location display 52 was selected by the GUI 44.

In operation, as shown in FIG. 3, the equipment identification selection area display 54 is displayed within the second display level when an associated tree expander associated with one of the selectable product area location icons 84 disposed within the product area location display 52 is selected.

As shown in FIG. 3, the ACVD and the BCVD selectable product area location icons were selected, and accordingly, the equipment identification selection display 54 shows an associated plurality equipment identification (EQP ID) icons representing EQP IDs for each piece of equipment capable of performing a CVD process within the ACVD product area. The ACVD product selection area location icon has associated EQP IDs ACNT01-A, ACNT01-B, ACNT01-D, ACNT02-A, ACNT01-B, and ACNT01-D disposed therewithin and the BCVD product selection area location icon has associated EQP IDs BCNT01-A, BCNT01-B, BCNT01-D, BCNT02-A, BCNT02-B, and BCNT01-D disposed therewithin.

The GUI 44 further has a third display level 90 having a DCOP selection area display 92, the DCOP selection area display 92 having a plurality of selectable DCOP ID icons 94 associated with a plurality of DCOP definitions 96.

The DCOP selection area display 92 is displayed within the third display level 90 when an associated tree expander associated with one of the selectable EQP ID icons disposed within the equipment identification display is selected.

As shown in FIG. 3–4, the ACNT01-A piece of fabrication equipment was selected in the second display level, and accordingly, the DCOP selection display 92 displays an associated plurality of DCOP ID icons COXDPD.01, CNTNPD.01, CNTDPD.01, and COXNPD.01, respectively representing DCOP IDs available for the ACNT01-A piece of fabrication equipment capable of performing a CVD process within the ACVD product area.

In operation, when one of the plurality of selectable DCOP icons 94 within the DCOP selection area 92 of the third display level 90 is selected, an EQP ID is inserted into the Equipment ID field 72, a data collection type 98 is inserted the data collection type field 74 and a DCOP ID 100 is inserted into the DCOP field 70.

As shown in FIG. 4, the DCOP ID COXDPD.01 is selected within the DCOP selection area 92 of the third display level 90, wherein the DCOP ID COXDPD.01 collects data in accordance with a data collection type entitled "ITEM" in the data collection type field 74. Accordingly, EQP ID ACNT01-A is input into the Equipment ID field 72, and the DCOP ID COXDPD.01 is input into the DCOP field 70 disposed within the data collection point portion 66 of the third display level 90.

The GUI 44 further displays a data collection table 102 having a plurality of data collection parameters 104 disposed within the data collection point portion 66 when one of the plurality of selectable DCOP icons 94 within the DCOP selection area 92 of the third display level 90 is selected. The plurality of data collection parameters 104 may be predefined or may be user-defined in accordance with a DCOP definition. Each of the data collection parameters 104 define how a plurality of data should be collected in accordance with the plurality of data collection parameters 104.

As shown in FIG. 4, the data collection type entitled ITEM is associated with a parameter as defined in the data collection table 102. Additionally, the data collection parameters, lower limit, upper limit and data collected further define the data collection table 102. The data collection table 102 further has an associated plurality of data fields 106 for insertion of collected data collected in accordance with the plurality of data parameters 104.

The data collection table 102 shown in FIG. 4 is used for illustrative purposes only and should not limit alternative embodiments of the data collection table, wherein each of the plurality of data collection parameters defined and associated data collected in accordance with the plurality of data collection parameters vary in accordance with each DCOP definition having an associated DCOP ID.

Figure 5:
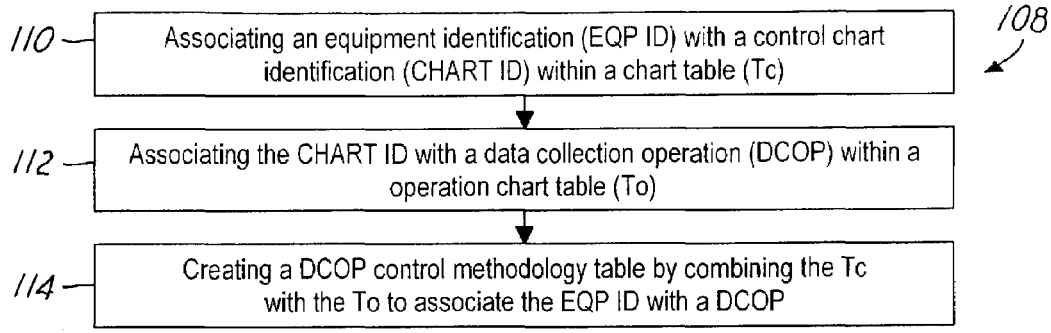
FIG. 5 is a flowchart defining additional steps of the method shown in FIG. 4.

In a preferred embodiment as shown in FIG. 5, a method 108 of using a process manufacturing integration system (PROMIS) configured to create a DCOP control methodology chart is provided. The method 108 has the steps of:

associating an equipment identification (EQP ID) with a control chart identification (CHART ID) within a chart table (Tc) (step 110);

associating the CHART ID with a data collection operation (DCOP) within a operation chart table (To) (step 112); and creating a DCOP control methodology table by combining the Tc with the To to associate the EQP ID with a DCOP (step 114).

Figure 6:
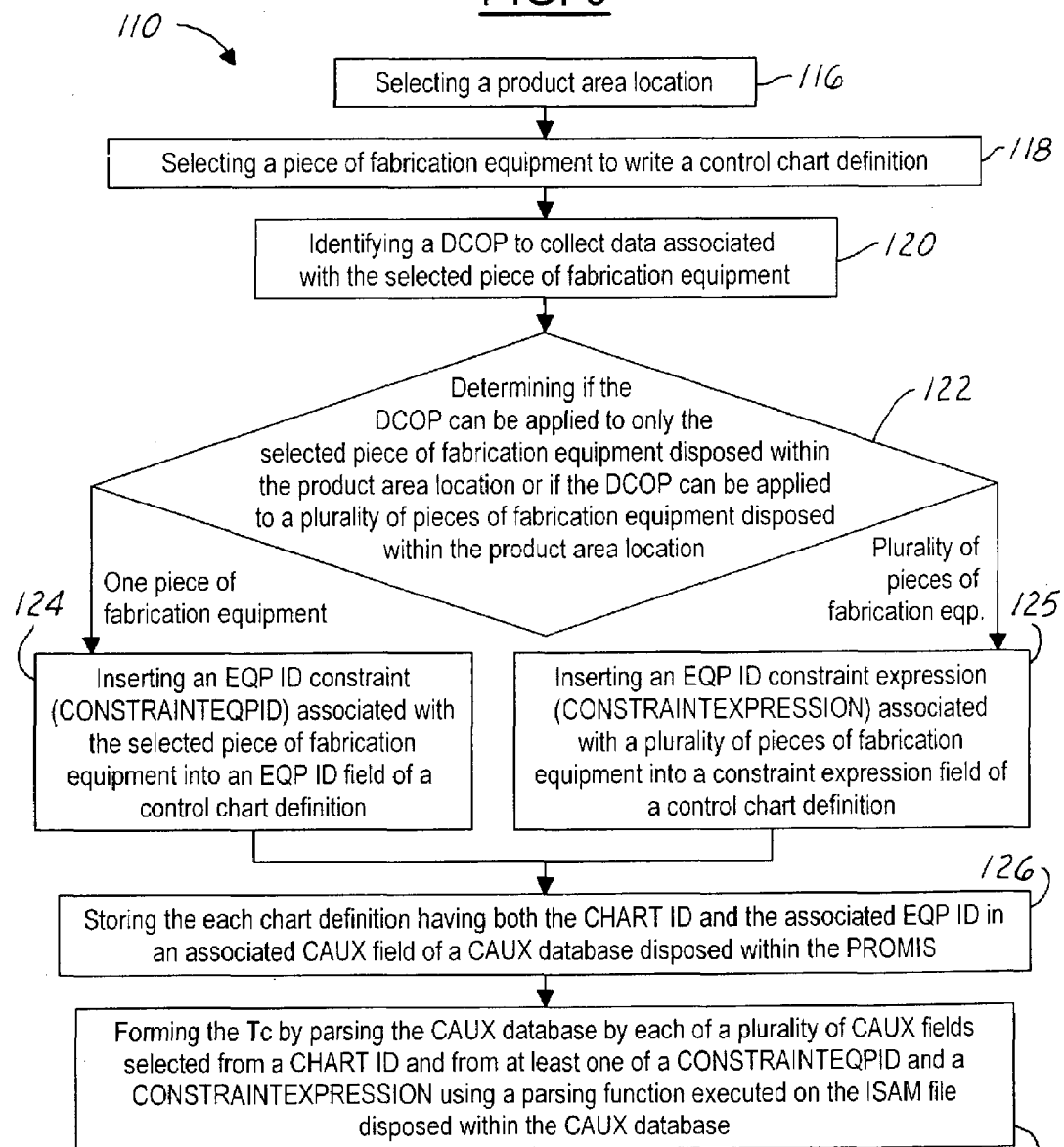
FIG. 6 is a flowchart showing a method of using a PROMIS system in accordance with the present invention.

In accordance with a preferred embodiment, FIG. 6 shows the step of associating an equipment identification (EQP ID) with a control chart identification (CHART ID) within a chart table (Tc) (step 110) further has the steps of:
 a) selecting a product area location (step 116), the product area location having at least one piece of fabrication equipment disposed therewithin;
 b) selecting a piece of fabrication equipment disposed within the product area location to write a control chart definition (step 118);
 c) identifying a DCOP to collect data associated with the selected piece of fabrication equipment disposed within the product area location (step 120);
 d) determining if the DCOP can be applied to only the selected piece of fabrication equipment disposed within the product area location or if the DCOP can be applied to a plurality of pieces of fabrication equipment disposed within the product area location (step 122);
 e) inserting an EQP ID constraint (CONSTRAINTEQPID) associated with the selected piece of fabrication equipment disposed within the product area location into an EQP ID field of a control chart definition by using a constraint insertion command (TRSFLD (EQPID) in ('EQPID')) if the DCOP can be applied to only the selected piece of fabrication equipment (step 124), wherein the control chart definition has an associated CHART ID and wherein the CHART ID defines a name of a control chart;
 f) inserting an EQP ID constraint expression (CONSTRAINTEXPRESSION) associated with a plurality of pieces of fabrication equipment disposed within the product area location into a constraint expression field of a control chart definition by using a constraint expression insertion command (TRSFLD(EQPID) in (('EQPID-1', 'EQPID-2' . . . 'EQPID-X'), wherein X=a total number of pieces of fabrication equipment disposed within the product area location) if the DCOP can be applied can be applied to more than only the selected piece of fabrication equipment (step 125), wherein the control chart definition has an associated CHART ID and wherein the CHART ID defines a name of a control chart;
 g) storing the each chart definition having both the CHART ID and the associated EQP ID in an associated CAUX field of a CAUX database disposed within the PROMIS (step 126);
 h) forming the Tc by parsing the CAUX database by each of a plurality of CAUX fields selected from a CHART ID and from at least one of a CONSTRAINTEQPID and a CONSTRAINTEXPRESSION using a parsing function ($\pi$) executed on the ISAM file disposed within the CAUX database (step 128), wherein $$T_c = \Pi_{chartid,\ constraintequipid,\ constraintexpression}(CAUX).$$

Figure 7:
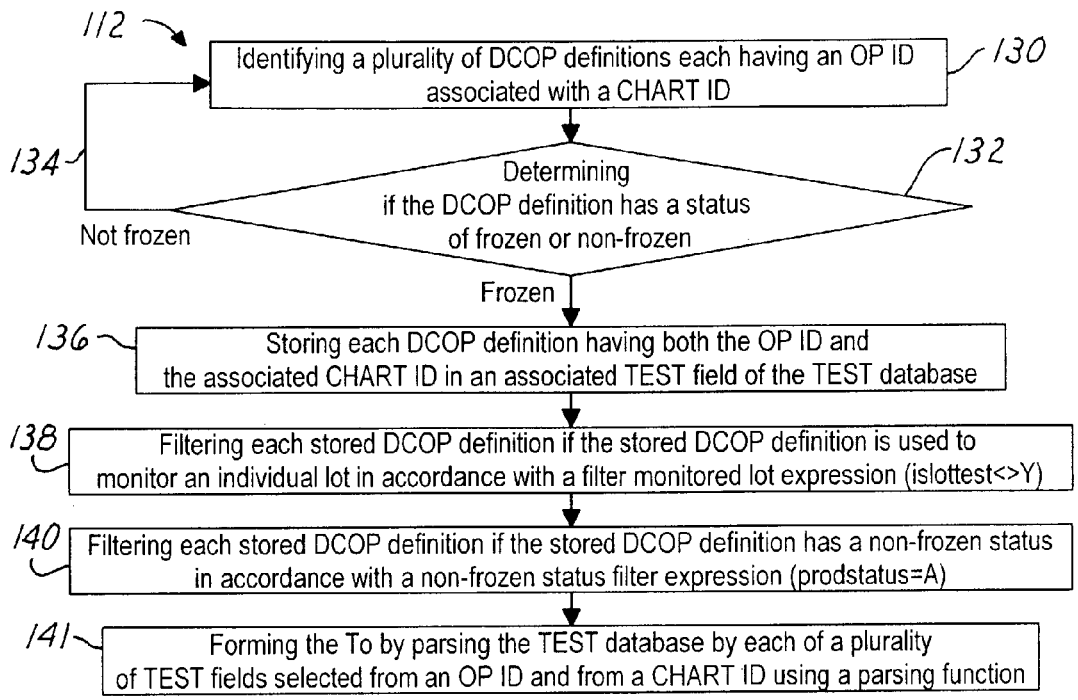
FIG. 7 is a flowchart showing a method of using a PROMIS system in accordance with the present invention.

In accordance with a preferred embodiment, FIG. 7 shows the step of associating the CHART ID with a data collection operation (DCOP) within a operation chart table (To) (step 112) further has the steps of:
 a) identifying a plurality of DCOP definitions each having an OP ID associated with a CHART ID (step 130);
 b) performing status control of a DCOP definition by determining if the DCOP definition has a status selected from a frozen status ready to be used for process monitoring and a non-frozen status not ready to be used for process monitoring (step 132);
 c) repeating steps 130–132 until the DCOP status is frozen (step 134);
 d) storing each DCOP definition having both the OP ID and the associated CHART ID in an associated TEST field of the TEST database (step 136);
 e) filtering each stored DCOP definition if the stored DCOP definition is used to monitor an individual lot using a filter function ($\sigma$) to filter out each stored DCOP used to monitor an individual lot in accordance with a filter monitored lot expression (islottest Y) (step 138);
 f) filtering each stored DCOP definition if the stored DCOP definition has a non-frozen status by using the filter function ($\sigma$) to filter out each non-frozen stored DCOM definition in accordance with a non-frozen status filter expression (prodstatus=A) (step 140); and
 g) forming the To by parsing the TEST database by each of a plurality of TEST fields selected from an OP ID and from a CHART ID using a parsing function ($\pi$) executed on the ISAM file disposed within the TEST if the islottest Y and if the prodstatus=A (step 141), wherein $$T_0 = \sigma_{islottest\ Y\ and\ prodstatus=A}(\Pi_{opno,\ chartid}(TEST)).$$

Figure 8:
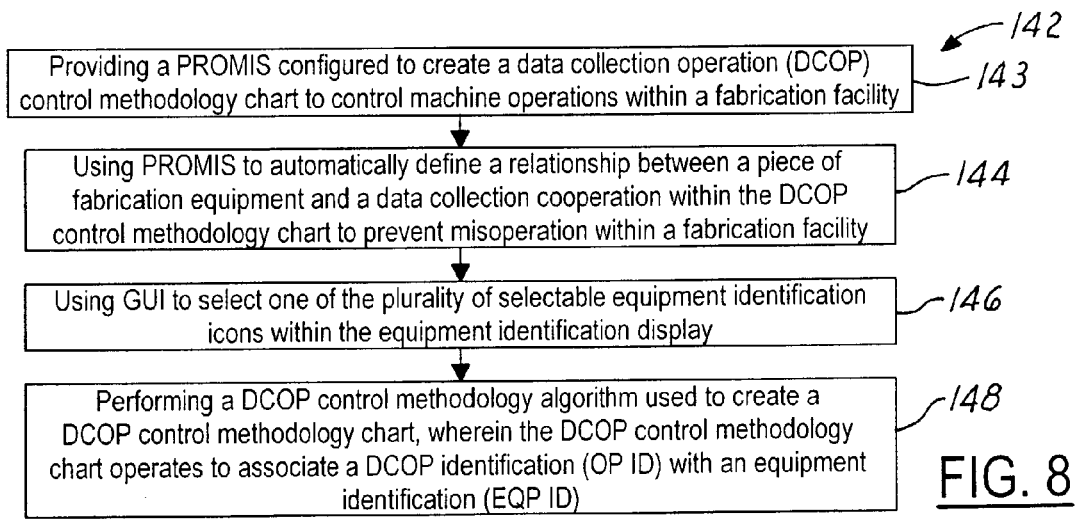
FIG. 8 is a flowchart showing a method of using a PROMIS system in accordance with the present invention.
Figure 9:
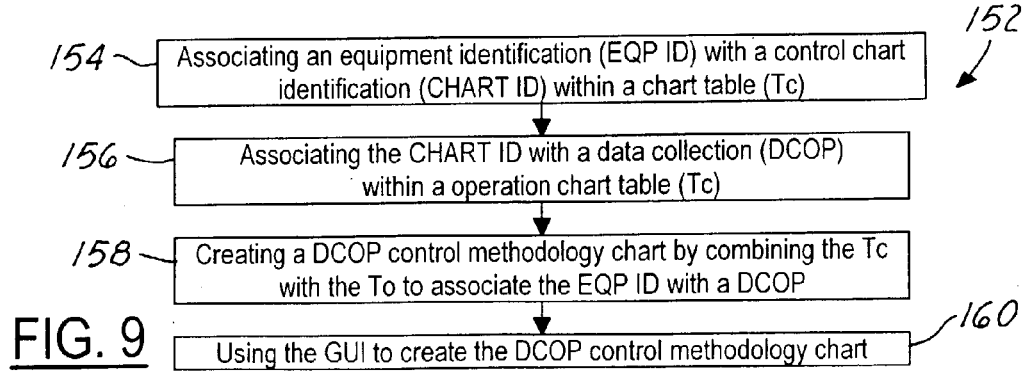
FIG. 9 is a flowchart showing a method of using a PROMIS system in accordance with the present invention.

In accordance with another preferred embodiment as shown in FIGS. 8–9, a method 142 of a process manufacturing integration system (PROMIS) configured to create a DCOP control methodology chart having the steps of:
 providing a PROMIS configured to create a data collection operation (DCOP) control methodology chart to control machine operations within a fabrication facility (step 143), wherein the PROMIS has
  a plurality of PROMIS data files (ISAM files),
  a TEST database having a plurality of TEST fields for storing a plurality of status controlled DCOP definitions within an associated ISAM file,
  a CAUX database having a plurality of CAUX fields for storing control chart definitions within an associated ISAM file, and
  an intelligent client environment having an associated graphical user interface (GUI), the GUI having a product area location display having a plurality of selectable product area location display icons, an equipment identification display having a plurality of selectable equipment identification icons, and a DCOP selection display; and
 using PROMIS to automatically define a relationship between a piece of fabrication equipment and a data collection operation within the DCOP control methodology chart to prevent mis-operation within a fabrication facility (step 144);
 using the GUI to select one of the plurality of selectable equipment identification icons within the equipment identification display (step 146);
 performing a DCOP control methodology algorithm used to create a DCOP control methodology chart, wherein the DCOP control methodology chart operates to associate a DCOP identification (OP ID) with an equipment identification (EQP ID) (step 148) upon using the GUI to select one of the plurality of selectable equipment identification icons within the equipment identification display.

The step performing a DCOP control methodology algorithm used to create a DCOP control methodology chart (step 148) preferably has steps similar to the steps 116–140 as shown in FIGS. 6,7 to define the method of performing the DCOP control methodology algorithm.

In accordance with another preferred embodiment of the present invention, FIG. 6,7 show a method 152 of using the PROMIS 20 configured to create a DCOP control methodology chart as shown in FIG. 9 having the steps of:
 a) associating an equipment identification (EQP ID) with a control chart identification (CHART ID) within a chart table (Tc) (step 154);
 b) associating the CHART ID with a data collection operation (DCOP) within a operation chart table (To) (step 156); and
 c) creating a DCOP control methodology chart by combining the Tc with the To to associate the EQP ID with a DCOP (step 158); and
 d) using the GUI to create the DCOP control methodology chart (step 160).

The step using the GUI to create the DCOP control methodology chart (step 160) further has the steps of performing a DCOP control methodology algorithm used to create a DCOP control methodology chart similar to steps 116–140 as shown in FIGS. 6,7.

Figure 10A:
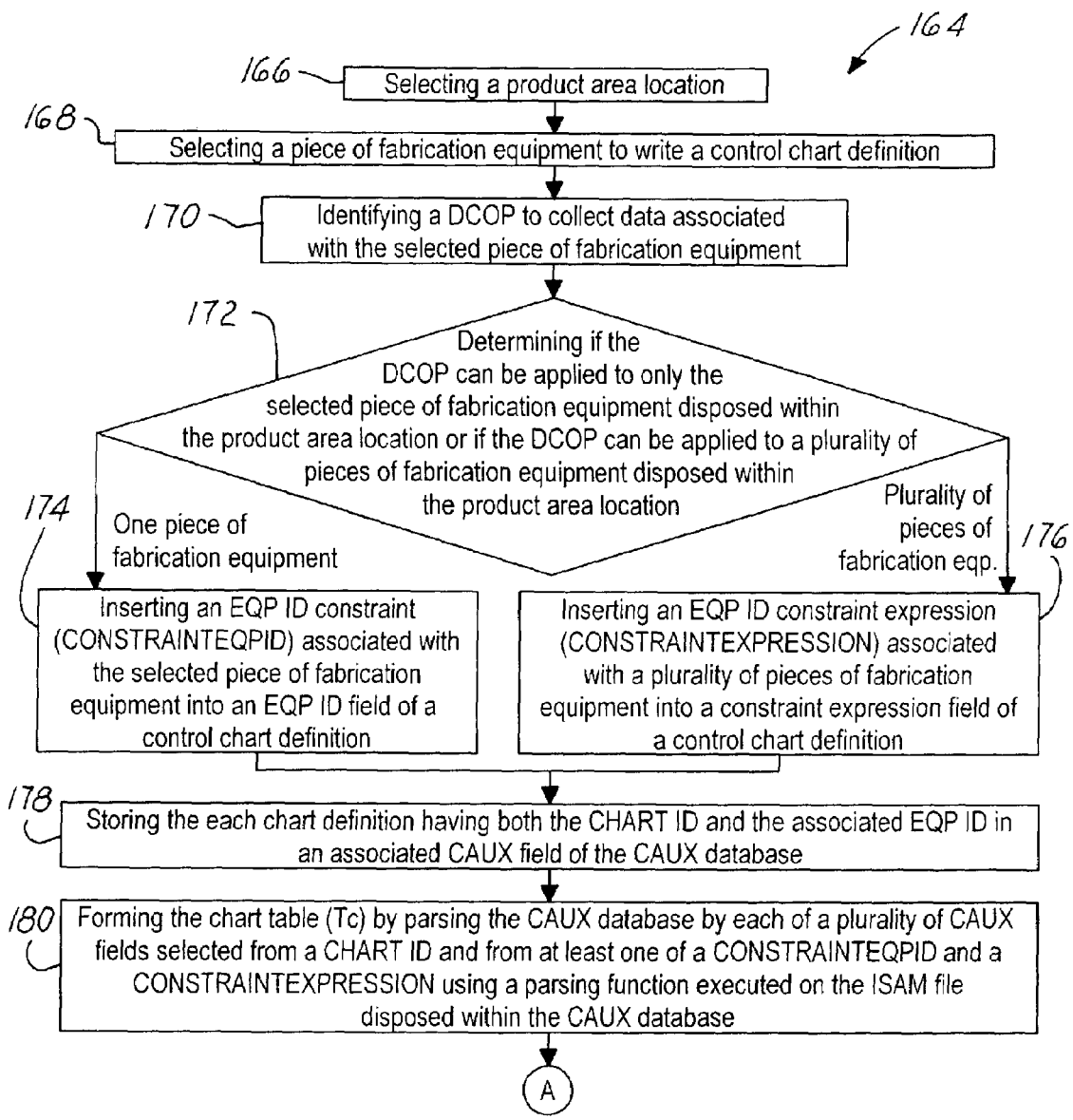
FIG. 10 is a flowchart showing a method of using a PROMIS system in accordance with the present invention.
Figure 10B:
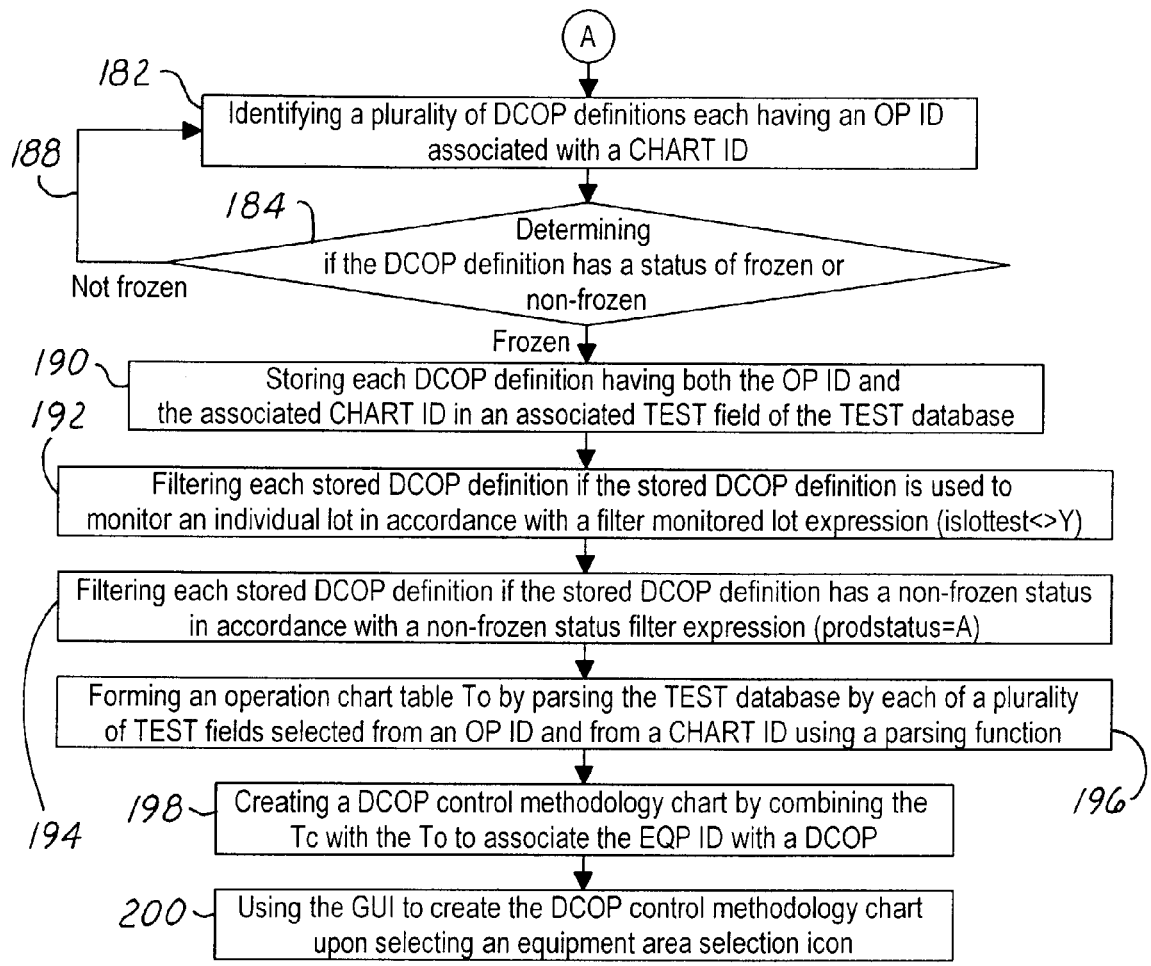

In accordance with another preferred embodiment of the present invention, FIG. 10 show a method 164 of using the PROMIS 20 configured to create a DCOP control methodology chart as shown in FIG. 10, having the steps of:
 a) selecting a product area location (step 166), the product area location having at least one piece of fabrication equipment disposed therewithin,
 b) selecting a piece of fabrication equipment disposed within the product area location to write a control chart definition (step 168),
 c) identifying a DCOP to collect data associated with the selected piece of fabrication equipment disposed within the product area location (step 170),
 d) determining if the DCOP can be applied to only the selected piece of fabrication equipment disposed within the product area location or if the DCOP can be applied to a plurality of pieces of fabrication equipment disposed within the product area location (step 172),
 e) inserting an EQP ID constraint (CONSTRAINTEQPID) associated with the selected piece of fabrication equipment disposed within the product area location into an EQP ID field of a control chart definition by using a constraint insertion command (TRSFLD (EQPID) in ('EQPID')) if the DCOP can be applied to only the selected piece of fabrication equipment (step 174), wherein the control chart definition has an associated CHART ID and wherein the CHART ID defines a name of a control chart,
 f) inserting an EQP ID constraint expression (CONSTRAINTEXPRESSION) associated with a plurality of pieces of fabrication equipment disposed within the product area location into a constraint expression field of a control chart definition by using a constraint expression insertion command (TRSFLD(EQPID) in ('EQPID-1', 'EQPID-2' ... 'EQPID-X'), wherein X=a total number of pieces of fabrication equipment disposed within the product area location) if the DCOP can be applied to more than only the selected piece of fabrication equipment (step 176), wherein the control chart definition has an associated CHART ID and wherein the CHART ID defines a name of a control chart,
 g) storing the each chart definition having both the CHART ID and the associated EQP ID in an associated CAUX field of the CAUX database (step 178),
 h) forming a chart table (Tc) by parsing the CAUX database by each of a plurality of CAUX fields selected from a CHART ID and from at least one of a CONSTRAINTEQPID and a CONSTRAINTEXPRESSION using a parsing function ($\pi$) executed on the ISAM file disposed within the CAUX database (step 180), wherein $T_c = \Pi_{chartid,\ constraintequipid,\ constraintexpression}(CAUX)$,
 wherein the Tc associates an equipment identification (EQP ID) with a control chart identification (CHART ID);
 i) identifying a plurality of DCOP definitions each having an OP ID associated with a CHART ID (step 182),
 j) performing status control of a DCOP definition by determining if the DCOP definition has a status selected from a frozen status ready to be used for process monitoring and a non-frozen status not ready to be used for process monitoring (step 184),
 k) repeating steps 182)–184) until the DCOP status is frozen (step 188);
 l) storing each DCOP definition having both the OP ID and the associated CHART ID in an associated TEST field of the TEST database (step 190),
 m) filtering each stored DCOP definition if the stored DCOP definition is used to monitor an individual lot using a filter function ($\sigma$) to filter out each stored DCOP used to monitor an individual lot in accordance with a filter monitored lot expression (islottest Y) (step 192),
 n) filtering each stored DCOP definition if the stored DCOP definition has a non-frozen status by using the filter function ($\sigma$) to filter out each non-frozen stored DCOM definition in accordance with a non-frozen status filter expression (prodstatus=A) (step 194), and
 o) forming an operation chart table (To) by parsing the TEST database by each of a plurality of TEST fields selected from an OP ID and from a CHART ID using a parsing function ($\pi$) executed on the ISAM file disposed within the TEST if the islottest Y and if the prodstatus=A (step 196), wherein $T_O = \sigma_{islottest\ Y\ and\ prodstatus=A}(\Pi_{opno,\ chartid}(TEST))$,
 wherein the To associates the CHART ID with a data collection operation (DCOP);
 p) creating a DCOP control methodology chart by combining the Tc with the To to associate the EQP ID with a DCOP (step 198); and
 q) using the GUI to create the DCOP control methodology chart in accordance with step 198) upon selecting an equipment area selection icon (step 200).

In a preferred embodiment, a DCOP control methodology chart is shown below having a plurality of columns of at least one of an Eqp ID column, a DCOP ID column, a Chart ID column, and a Location column for insertion of associated Eqp ID, DCOP ID, Chart ID, and Location data within a plurality of associated fields, respectively. The DCOP control methodology chart shown below was created upon performing step 200, wherein the EQP ID ACNT01-A is input into the Eqp ID column, the DCOP ID COXDPD.01 is input into the DCOP ID column, a Chart ID ACVCHT01 is input into the Chart ID column, and the product area location ACVD is input into the Location column.

| Eqp ID | DCOP ID | Chart ID | Location |
|---|---|---|---|
| ACNT01-A | COXDPD.01 | ACVCHT01 | ACVD |

In accordance with a preferred embodiment, preferably, the DCOP control methodology chart is stored within an optional DCOP control methodology database 204 (not shown) within the PROMIS 20. The DCOP control methodology chart may then be accessed when the equipment ID ACNT01-A is selected within the equipment identification selection area display 54.

Each time a control chart having an associated CHART ID is defined by a fabrication equipment engineer, an equipment constraint or equipment constraint expression is inserted into the control chart definition in accordance with the method 164 disclosed herewithin. Using a control chart definition display of the GUI 44, the EQP ID constraint ACNT01-A for the DCOP control methodology chart disclosed herewithin is inserted within an EQP constraint field of a control chart definition 208 (not shown), wherein the control chart definition is a type of chart definition well known in the process monitoring arts, having the Chart ID ACVCHT01 when the control chart is defined using a control chart definition field command (TRSFLD(EQPID) in ('ACNT01-A')). Additionally, the DCOP ID is associated with the Chart ID ACVCHT01 in accordance with the method 164 disclosed herewithin. When the GUI 44 is used to select the equipment ID ACNT01-A in accordance with the method 164 (as shown in FIG. 10) disclosed herewithin, the DCOP ID associated with the Chart ID ACVCHT01 is joined with the EQP ID ACNT01-A in the DCOP methodology chart table as shown above.

From the foregoing, it should be appreciated that a system and method are provided for an automatic process monitoring system for associating an equipment identification and a data collection operation and method of use thereof.

While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A process manufacturing integration system (PROMIS) configured to create a DCOP control methodology chart comprising:
   a plurality of PROMIS data files (ISAM files);
   a TEST database having a plurality of TEST fields for storing a plurality of status controlled DCOP definitions within an associated ISAM file;
   a CAUX database having a plurality of CAUX fields for storing a plurality of control chart definitions within an associated ISAM file; and
   an intelligent client environment having an associated graphical user interface (GUI) to better control each of a plurality of data collection operations (DCOP).

2. The system of claim 1, wherein the GUI comprises:
   a navigation window having a tree architecture, wherein the tree architecture has
   a hierarchy of two expandable display levels selected from
      at least a first display level having a product area location display, and
      a second display level having an equipment identification selection area display, wherein each of the expandable display levels has
         an associated data entry portion, and
         an associated plurality of selectable icons, each of the plurality of selectable icons each having an associated tree expander.

3. The system of claim 2 wherein the GUI further comprises:
   a third display level having a DCOP selection area display, the DCOP selection area display having a plurality of selectable DCOP icons.

4. The system of claim 3, wherein the equipment identification selection area display is displayed within the second display level when an associated tree expander associated with each of the selectable icons disposed within the product area location display is selected, wherein associated time data and associated date data are automatically input into the time field and the date field disposed within the data collection point portion respectively by the PROMIS when one of the associated plurality of selected icons disposed within the product area location display is selected.

5. The system of claim 2, wherein the data entry portion associated with each of the plurality of display levels disposed within the GUI comprises:
   a data collection point portion having
      a plurality of predefined fields into which data collection data may be input, the plurality of predefined fields selected from the group of a DCOP field, an equipment ID field, a data collection type field, a date field, and a time field, the data collection point portion further having
      an accept data collection button, and
      a cancel data collection button,
   wherein the data collection type field displays an associated data collection table having a plurality of data collection parameters when one of the plurality of selectable DCOP within the DCOP selection area of the third display level is selected.

6. The system of claim 5, wherein associated DCOP data is automatically input into the DCOP field disposed within the GUI and associated data collection type data is automatically input into the data collection type field disposed within the GUI when a DCOP icon within the third display level having the DCOP selection area is selected.

7. The system of claim 2, wherein upon selecting the associated tree expander associated with each of the associated plurality of selectable icons within the first display level having a product selection area within the GUI, the second display level having the identification selection area is displayed, and wherein upon selecting one of the associated plurality of selected icons disposed within the product area location display, associated time data and associated date data are automatically input into the time field and the date field disposed within the data collection point portion respectively by the PROMIS.

8. A method of configuring the PROMIS of claim 1 to create a DCOP control methodology chart, comprising the steps of:
   a) associating an equipment identification (EQP ID) with a control chart identification (CHART ID) within a chart table (Tc);
   b) associating the CHART ID with a data collection operation (DCOP) within a operation chart table (To);
   c) creating a DCOP control methodology chart by combining the Tc with the To to associate the EQP ID with a DCOP; and d) using the GUI to create the DCOP control methodology chart.

9. The method of claim 8, wherein the step of associating the EQP ID with the CHART ID within the Tc comprises the steps of:
   a) selecting a product area location icon disposed within product area location, the product area location having at least one piece of fabrication equipment disposed therewithin;
   b) selecting a piece of fabrication equipment disposed within the product area location to write a control chart definition;
   c) identifying a DCOP to collect data associated with the selected piece of fabrication equipment disposed within the product area location;
   d) determining if the DCOP can be applied to only the selected piece of fabrication equipment disposed within the product area location or if the DCOP can be applied to a plurality of pieces of fabrication equipment disposed within the product area location;
   e) inserting an EQP ID constraint (CONSTRAINTEQPID) associated with the selected piece of fabrication equipment disposed within the product area location into an EQP ID field of a control chart definition by using a constraint insertion command (TRSFLD (EQPID) in ('EQPID')) if the DCOP can be applied to only the selected piece of fabrication equipment, wherein the control chart definition has an associated CHART ID and wherein the CHART ID defines a name of a control chart;
   f) inserting an EQP ID constraint expression (CONSTRAINTEXPRESSION) associated with a plurality of pieces of fabrication equipment disposed within the product area location into a constraint expression field of a control chart definition by using a constraint expression insertion command (TRSFLD(EQPID) in ('EQPID-1', 'EQPID-2'... 'EQPID-X'), wherein X=a total number of pieces of fabrication equipment disposed within the product area location) if the DCOP can be applied to more than only the selected piece of fabrication equipment, wherein the control chart definition has an associated CHART ID and wherein the CHART ID defines a name of a control chart;
   g) storing the each chart definition having both the CHART ID and the associated EQP ID in an associated CAUX field of the CAUX database;
   h) forming the Tc by parsing the CAUX database by each of a plurality of CAUX fields selected from a CHART ID and from at least one of a CONSTRAINTEQPID and a CONSTRAINTEXPRESSION using a parsing function ($\pi$) executed on the ISAM file disposed within the CAUX database, wherein $$T_c = \Pi_{chartid,\ constraintequipid,\ constraintexpression}(CAUX).$$

10. The method of claim 9, wherein the step of associating the CHART ID with the DCOP within the To comprises the steps of:
   a) identifying a plurality of DCOP definitions each having an OP ID associated with a CHART ID;
   b) performing status control of a DCOP definition by determining if the DCOP definition has a status selected from a frozen status ready to be used for process monitoring and a non-frozen status not ready to be used for process monitoring;
   c) repeating steps 18a)–b) until the DCOP status is frozen;
   d) storing each DCOP definition having both the OP ID and the associated CHART ID in an associated TEST field of the TEST database;
   e) filtering each stored DCOP definition if the stored DCOP definition is used to monitor an individual lot using a filter function ($\sigma$) to filter out each stored DCOP used to monitor an individual lot in accordance with a filter monitored lot expression (islottest Y);
   f) filtering each stored DCOP definition if the stored DCOP definition has a non-frozen status by using the filter function ($\sigma$) to filter out each non-frozen stored DCOM definition in accordance with a non-frozen status filter expression (prodstatus=A); and
   g) forming the To by parsing the TEST database by each of a plurality of TEST fields selected from an OP ID and from a CHART ID using a parsing function ($\pi$) executed on the ISAM file disposed within the TEST if the islottest Y and if the prodstatus=A, wherein $$T_0 = \sigma_{islottest\ Y\ and\ prodstatus=A}(\Pi_{opno,\ chartid}(TEST)).$$

11. A method of configuring the PROMIS of claim 1 to create a DCOP control methodology chart, comprising the steps of:
   a) selecting a product area location, the product area location having at least one piece of fabrication equipment disposed therewithin;
   b) selecting a piece of fabrication equipment disposed within the product area location to write a control chart definition;
   c) identifying a DCOP to collect data associated with the selected piece of fabrication equipment disposed within the product area location;
   d) determining if the DCOP can be applied to only the selected piece of fabrication equipment disposed within the product area location or if the DCOP can be applied to a plurality of pieces of fabrication equipment disposed within the product area location;
   e) inserting an EQP ID constraint (CONSTRAINTEQPID) associated with the selected piece of fabrication equipment disposed within the product area location into an EQP ID field of a control chart definition by using a constraint insertion command (TRSFLD (EQPID) in ('EQPID')) if the DCOP can be applied to only the selected piece of fabrication equipment, wherein the control chart definition has an associated CHART ID and wherein the CHART ID defines a name of a control chart;
   f) inserting an EQP ID constraint expression (CONSTRAINTEXPRESSION) associated with a plurality of pieces of fabrication equipment disposed within the product area location into a constraint expression field of a control chart definition by using a constraint expression insertion command TRSFLD(EQPID) in ('EQPID-1', 'EQPID-2'... 'EQPID-X'), wherein X=a total number of pieces of fabrication equipment disposed within the product area location) if the DCOP can be applied to more than only the selected piece of fabrication equipment, wherein the control chart definition has an associated CHART ID and wherein the CHART ID defines a name of a control chart;
   g) storing the each chart definition having both the CHART ID and the associated EQP ID in an associated CAUX field of the CAUX database;
   h) forming a chart table (Tc) by parsing the CAUX database by each of a plurality of CAUX fields selected from a CHART ID and from at least one of a CONSTRAINTEQPID and a CONSTRAINTEXPRES- SION using a parsing function ($\pi$) executed on the ISAM file disposed within the CAUX database, wherein $$T_c = \Pi_{chartid,\ constraintequipid,\ constraintexpresion}(CAUX),$$

wherein the Tc associates an equipment identification (EQP ID) with a control chart identification (CHART ID);

i) identifying a plurality of DCOP definitions each having an OP ID associated with a CHART ID;

j) performing status control of a DCOP definition by determining if the DCOP definition has a status selected from a frozen status ready to be used for process monitoring and a non-frozen status not ready to be used for process monitoring;

k) repeating steps 19i)–j) until the DCOP status is frozen;

l) storing each DCOP definition having both the OP ID and the associated CHART ID in an associated TEST field of the TEST database;

m) filtering each stored DCOP definition if the stored DCOP definition is used to monitor an individual lot using a filter function ($\sigma$) to filter out each stored DCOP used to monitor an individual lot in accordance with a filter monitored lot expression (islottest Y);

n) filtering each stored DCOP definition if the stored DCOP definition has a non-frozen status by using the filter function ($\sigma$) to filter out each non-frozen stored DCOM definition in accordance with a non-frozen status filter expression (prodstatus=A);

o) forming an operation chart table (To) by parsing the TEST database by each of a plurality of TEST fields selected from an OP ID and from a CHART ID using a parsing function ($\pi$) executed on the ISAM file disposed within the TEST if the islottest Y and if the prodstatus=A, wherein $T_0 = \sigma_{islottest\ Y\ and\ prodstatus=A}(\Pi_{opno,\ chartid}(TEST))$, wherein the To associates the CHART ID with a data collection operation (DCOP);

p) creating a DCOP control methodology chart by combining the Tc with the To to associate the EQP ID with a DCOP; and q) using the GUI to create the DCOP control methodology chart in accordance with step 19p) upon selecting an equipment area selection icon.

12. A method of using a process manufacturing integration system (PROMIS) configured to create a DCOP control methodology chart comprising the steps of:

a) associating an equipment identification (EQP ID) with a control chart identification (CHART ID) within a chart table (Tc);

b) associating the CHART ID with a data collection operation (DCOP) within a operation chart table (To); and c) creating a DCOP control methodology chart by combining the Tc with the To to associate the EQP ID with a DCOP.

13. The method of claim 12, wherein the step of associating the EQP ID with the CHART ID within the Tc comprises the steps of:

a) selecting a product area location, the product area location having at least one piece of fabrication equipment disposed therewithin;

b) selecting a piece of fabrication equipment disposed within the product area location to write a control chart definition;

c) identifying a DCOP to collect data associated with the selected piece of fabrication equipment disposed within the product area location;

d) determining if the DCOP can be applied to only the selected piece of fabrication equipment disposed within the product area location or if the DCOP can be applied to a plurality of pieces of fabrication equipment disposed within the product area location;

e) inserting an EQP ID constraint (CONSTRAINTEQPID) associated with the selected piece of fabrication equipment disposed within the product area location into an EQP ID field of a control chart definition by using a constraint insertion command (TRSFLD (EQPID) in ('EQPID')) if the DCOP can be applied to only the selected piece of fabrication equipment, wherein the control chart definition has an associated CHART ID and wherein the CHART ID defines a name of a control chart;

f) inserting an EQP ID constraint expression (CONSTRAINTEXPRESSION) associated with a plurality of pieces of fabrication equipment disposed within the product area location into a constraint expression field of a control chart definition by using a constraint expression insertion command (TRSFLD (EQPID) in (('EQPID-1', 'EQPID-2' . . . 'EQPID-X'), wherein X=a total number of pieces of fabrication equipment disposed within the product area location) if the DCOP can be applied to more than only the selected piece of fabrication equipment, wherein the control chart definition has an associated CHART ID and wherein the CHART ID defines a name of a control chart;

g) storing the each chart definition having both the CHART ID and the associated EQP ID in an associated CAUX field of a CAUX database disposed within the PROMIS;

h) forming the Tc by parsing the CAUX database by each of a plurality of CAUX fields selected from a CHART ID and from at least one of a CONSTRAINTEQPID and a CONSTRAINTEXPRESSION using a parsing function ($\pi$) executed on the ISAM file disposed within the CAUX database, wherein $$T_c = \Pi_{chartid,\ constraintequipid,\ constraintexpression}(CAUX).$$

14. The method of claim 13, wherein the step of associating the CHART ID with the DCOP within the To comprises the steps of:

a) identifying a plurality of DCOP definitions each having an OP ID associated with a CHART ID;

c) repeating steps 10a)–b) until the DCOP status is frozen;

d) storing each DCOP definition having both the OP ID and the associated CHART ID in an associated TEST field of the TEST database;

e) filtering each stored DCOP definition if the stored DCOP definition is used to monitor an individual lot using a filter function ($\sigma$) to filter out each stored DCOP used to monitor an individual lot in accordance with a filter monitored lot expression (islottest Y);

f) filtering each stored DCOP definition if the stored DCOP definition has a non-frozen status by using the filter function ($\sigma$) to filter out each non-frozen stored DCOM definition in accordance with a non-frozen status filter expression (prodstatus=A); and g) forming the To by parsing the TEST database by each of a plurality of TEST fields selected from an OP ID and from a CHART ID using a parsing function ($\pi$) executed on the ISAM file disposed within the TEST if the islottest Y and if the prodstatus=A, wherein $$T_0 = \sigma_{islottest\ Y\ and\ prodstatus=A}(\Pi_{opno,\ chartid}(TEST)).$$

15. A method of using a process manufacturing integration system (PROMIS) configured to create a DCOP control methodology chart comprising the steps of:
providing a PROMIS configured to create a data collection operation (DCOP) control methodology chart to control machine operations within a fabrication facility, wherein the PROMIS has
a plurality of PROMIS data files (ISAM files),
a TEST database having a plurality of TEST fields for storing a plurality of status controlled DCOP definitions within an associated ISAM file,
a CAUX database having a plurality of CAUX fields for storing control chart definitions within an associated ISAM file, and
an intelligent client environment having an associated graphical user interface (GUI), the GUI having a product area location display having a plurality of selectable product area location display icons, an equipment identification display having a plurality of selectable equipment identification icons, and a DCOP selection display; and
using PROMIS to automatically define a relationship between a piece of fabrication equipment and a data collection operation within the DCOP control methodology chart to prevent mis-operation within a fabrication facility.

16. The method of claim 15, further comprising the step of:
using the GUI to select one of the plurality of selectable equipment identification icons within the equipment identification display;
performing a DCOP control methodology algorithm used to create a DCOP control methodology chart, wherein the DCOP control methodology chart operates to associate a DCOP identification (OP ID) with an equipment identification (EQP ID) upon using the GUI to select one of the plurality of selectable equipment identification icons within the equipment identification display.

17. The method of claim 16, wherein the step performing a DCOP control methodology algorithm used to create a DCOP control methodology chart comprises the steps of:
a) associating an equipment identification (EQP ID) with a control chart identification (CHART ID) within a chart table (Tc);
b) associating the CHART ID with a data collection operation (DCOP) within a operation chart table (To); and
c) creating a DCOP control methodology chart by combining the Tc with the To to associate the EQP ID with a DCOP.

18. The method of claim 17, wherein the step of associating the EQP ID with the CHART ID within the Tc comprises the steps of:
a) selecting a product area location, the product area location having at least one piece of fabrication equipment disposed therewithin;
b) selecting a piece of fabrication equipment disposed within the product area location to write a control chart definition;
c) identifying a DCOP to collect data associated with the selected piece of fabrication equipment disposed within the product area location;
d) determining if the DCOP can be applied to only the selected piece of fabrication equipment disposed within the product area location or if the DCOP can be applied to a plurality of pieces of fabrication equipment disposed within the product area location;
e) inserting an EQP ID constraint (CONSTRAINTEQPID) associated with the selected piece of fabrication equipment disposed within the product area location into an EQP ID field of a control chart definition by using a constraint insertion command (TRSFLD (EQPID) in ('EQPID')) if the DCOP can be applied to only the selected piece of fabrication equipment, wherein the control chart definition has an associated CHART ID and wherein the CHART ID defines a name of a control chart;
f) inserting an EQP ID constraint expression (CONSTRAINTEXPRESSION) associated with a plurality of pieces of fabrication equipment disposed within the product area location into a constraint expression field of a control chart definition by using a constraint expression insertion command (TRSFLD(EQPID) in ('EQPID-1', 'EQPID-2' ... 'EQPID-X'), wherein X=a total number of pieces of fabrication equipment disposed within the product area location) if the DCOP can be applied to more than only the selected piece of fabrication equipment, wherein the control chart definition has an associated CHART ID and wherein the CHART ID defines a name of a control chart;
g) storing the each chart definition having both the CHART ID and the associated EQP ID in an associated CAUX field of the CAUX database;
h) forming the Tc by parsing the CAUX database by each of a plurality of CAUX fields selected from a CHART ID and from at least one of a CONSTRAINTEQPID and a CONSTRAINTEXPRESSION using a parsing function ($\pi$) executed on the ISAM file disposed within the CAUX database, wherein $$T_c = \Pi_{chartid,\ constraintequipid,\ constraintexpression}(CAUX).$$

19. The method of claim 18, wherein the step of associating the CHART ID with the DCOP within the To comprises the steps of:
a) identifying a plurality of DCOP definitions each having an OP ID associated with a CHART ID;
b) performing status control of a DCOP definition by determining if the DCOP definition has a status selected from a frozen status ready to be used for process monitoring and a non-frozen status not ready to be used for process monitoring;
c) repeating steps 15a)-b) until the DCOP status is frozen;
d) storing each DCOP definition having both the OP ID and the associated CHART ID in an associated TEST field of the TEST database;
e) filtering each stored DCOP definition if the stored DCOP definition is used to monitor an individual lot using a filter function ($\sigma$) to filter out each stored DCOP used to monitor an individual lot in accordance with a filter monitored lot expression (islottest Y);
f) filtering each stored DCOP definition if the stored DCOP definition has a non-frozen status by using the filter function ($\sigma$) to filter out each non-frozen stored DCOM definition in accordance with a non-frozen status filter expression (prodstatus=A); and
g) forming the To by parsing the TEST database by each of a plurality of TEST fields selected from an OP ID and from a CHART ID using a parsing function ($\pi$) executed on the ISAM file disposed within the TEST if the islottest Y and if the prodstatus=A, wherein $$T_0 = \sigma_{islottest\ Y\ and\ prodstatus=A}(\Pi_{opno,\ chartid}\text{TEST}).$$

* * * * *